(12) United States Patent
Hartick et al.

(10) Patent No.: US 7,457,394 B2
(45) Date of Patent: Nov. 25, 2008

(54) DEVICE AND METHOD FOR INSPECTING OBJECTS

(75) Inventors: Martin Hartick, Bad Nauheim (DE); Hermann Ries, Taunusstein (DE)

(73) Assignee: Smiths Heimann GmbH, Wiesbaden (DE)

( * ) Notice: Subject to any disclaimer, the term of this patent is extended or adjusted under 35 U.S.C. 154(b) by 110 days.

(21) Appl. No.: 11/325,434

(22) Filed: Jan. 5, 2006

(65) Prior Publication Data

US 2008/0137809 A1 Jun. 12, 2008

Related U.S. Application Data

(63) Continuation of application No. PCT/EP2004/006329, filed on Jun. 11, 2004.

(30) Foreign Application Priority Data

Jul. 5, 2003 (DE) ................. 103 30 521

(51) Int. Cl.
*G01N 23/04* (2006.01)
*A61B 6/08* (2006.01)
(52) U.S. Cl. ......................... 378/57; 378/206
(58) Field of Classification Search ........... 378/4, 378/19, 51–57, 63, 98.8, 200–208
See application file for complete search history.

(56) References Cited

U.S. PATENT DOCUMENTS

| | | | |
|---|---|---|---|
| 4,379,348 A | 4/1983 | Haas et al. | |
| 4,469,403 A * | 9/1984 | Haas et al. | 359/821 |
| 4,987,584 A | 1/1991 | Doenges | |
| 5,182,764 A | 1/1993 | Peschmann et al. | |
| 5,313,511 A | 5/1994 | Annis et al. | |
| 5,598,269 A * | 1/1997 | Kitaevich et al. | 356/399 |
| 5,835,562 A * | 11/1998 | Ramsdell et al. | 378/206 |
| 6,048,097 A * | 4/2000 | Heinze | 378/206 |
| 6,079,876 A * | 6/2000 | Schuetz | 378/205 |
| 6,459,760 B1 * | 10/2002 | D'Ambrosio | 378/43 |
| 6,968,034 B2 * | 11/2005 | Ellengogen | 378/57 |

FOREIGN PATENT DOCUMENTS

| | | |
|---|---|---|
| DE | 25 49 211 | 5/1977 |
| DE | 44 06 956 A1 | 9/1995 |
| DE | 199 54 662 | 6/2001 |
| GB | 1 511 817 | 5/1978 |
| GB | 2 359 720 A | 8/2001 |
| WO | WO-97/12229 A1 | 4/1997 |
| WO | WO-99/66317 A1 | 12/1999 |
| WO | WO 03/065077 A2 | 8/2003 |

* cited by examiner

*Primary Examiner*—Irakli Kiknadze
(74) *Attorney, Agent, or Firm*—Muncy, Geissler, Olds & Lowe, PLLC

(57) ABSTRACT

A device is provided for inspecting objects, particularly pieces of luggage, for suspicious contents using electromagnetic radiation. The device includes a housing comprised of a support and a closable opening through which an object to be inspected can be placed on a receiving element; a source for electromagnetic radiation and a designated detector array, both of which are arranged in the housing such that an inspection area is located above the receiving element; a positioning aid, which indicates the inspection area to an operator; and an evaluation unit including a computer, where the radiation intensities measured by the detector array are evaluated with respect to suspicious materials.

25 Claims, 2 Drawing Sheets

DEVICE AND METHOD FOR INSPECTING OBJECTS

This nonprovisional application is a continuation application that claims priority to PCT/EP2004/006329, which was filed on Jun. 11, 2004, which claims priority to German Patent Application No. DE 10330521, which was filed in Germany on Jul. 5, 2003, and which are both herein incorporated by reference.

BACKGROUND OF THE INVENTION

1. Field of the Invention

The present invention relates to a device and a method for inspecting objects, such as pieces of luggage, for suspicious contents using electromagnetic radiation, for example, X-ray beams.

2. Description of the Background Art

To inspect check-in luggage at airports, it is known to use devices and systems with which to check the pieces of luggage with X-ray beams for the presence of prohibited objects. If explosives are also to be detected, slower devices for a detailed analytical inspection are deployed, which use the X-ray diffraction method or work as computer tomographs, for example. It is known to integrate these devices as a second step in an automatic inspection system, whereby pieces of luggage identified in the first step as not positively harmless are passed on to the devices.

Such an automatic inspection system is described in DE 44 06 956. In a first step, a conventional X-ray scanning device is used; a second step utilizes X-ray diffraction or a nuclear method, for example, a neutron activation analysis technique. From U.S. Pat. No. 5,182,764, a two-step device is known, wherein a computer tomograph is utilized as a second step. Both devices work automatically, whereby the location of objects of interest that were identified in the first step is passed on to the second step.

Due to their integration in an automatic inspection process, the devices for the detailed analytical inspection in the second step are very complex. Their complexity and their layout to accommodate the maximal dimensions of a piece of luggage require them to be of a very large design.

SUMMARY OF THE INVENTION

It is therefore an object of the invention to provide a device and a method for inspecting objects with suspicious contents having a construction that is as compact and simple as possible.

This objective is met with a device according to the invention that includes a housing having a receiving element and a closable opening, through which an object to be inspected can be placed on the receiving element, the housing has a source for electromagnetic radiation and a designated detector array, which is arranged in the housing such that the inspection area is located above the receiving element, and has a positioning aid that outlines the area of inspection for the operator, and has an evaluation unit with a computer that evaluates the radiation intensities measured by the detector array in regard to suspicious materials.

According to the invention, the inspection device is constructed such that the positioning of the object to be inspected is done by personnel. In this way, the inspection device can be constructed in a less complex and more compact manner. The inspection device of such a design can be particularly beneficially deployed for inspections, where personnel are already involved for different reasons.

Preferably, X-ray beams are used for the inspection, which are emitted from an X-ray source either as a needle-shaped primary beam (pencil beam), or as a fan-shaped beam.

In the device, diffracted X-ray beams are evaluated for inspection. Thereby, either the energy dispersion of diffracted radiation is examined in defined angles by appropriately positioned detectors, or the angle dispersion is determined by monochromatic X-ray radiation.

Especially well suited for a positioning aid is an optical positioning aid, particularly a cross hair or an optical frame. The result of the evaluation is communicated to the operator via an indicator device, which is a display unit or a light indicator, In its most simple form, only the inspection device is utilized for the inspection of objects. Particularly beneficial is its combination with a conventional X-ray apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
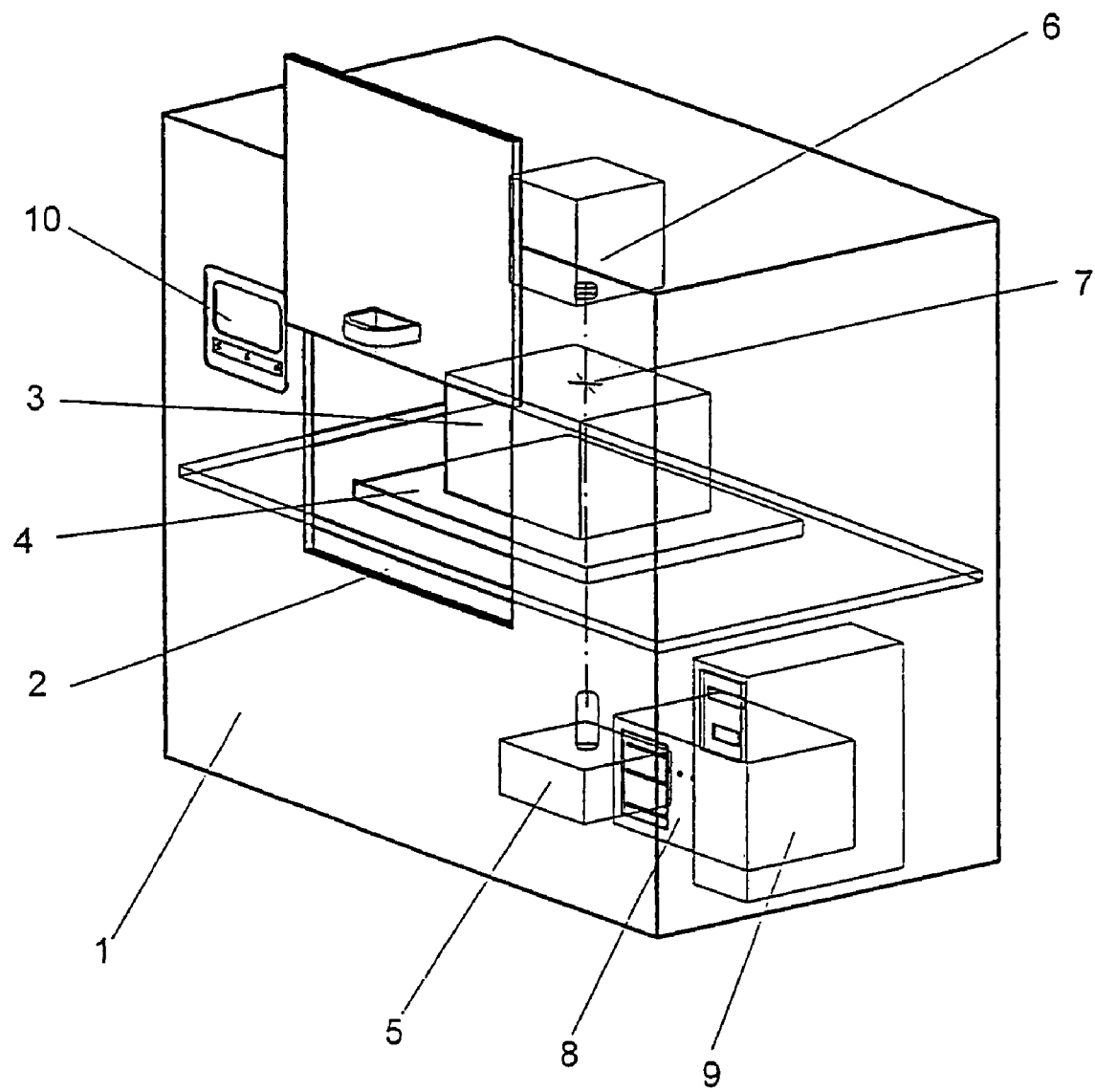
FIG. 1 illustrates an inspection device according to an embodiment of the present invention.

The inspection device and the inspection system according to an embodiment of the present invention are typically deployed at airports or at customs for the inspection of luggage in order to check the pieces of luggage for the presence of prohibited objects, for example, explosives.

The inspection device includes a housing 1 having a closable opening 2, through which an object 3 to be inspected, for example, a piece of luggage or an object in the piece of luggage, for example, an art object or a generally used object having a cavity, can be placed for inspection. Inside the housing 1 is a receiving element 4, onto which the object 3 is placed. A fixed or movable source 5 for electromagnetic radiation, preferably an X-ray source, and a designated detector array 6 are arranged in the housing such that the inspection area is located above the receiving element 4. The device includes a positioning aid 7, which indicates the area of inspection to allow an operator to place the object 3 to be inspected onto the receiving element 4 such that the area of interest inside the object 3 is examined. Preferably, the positioning aid 7 is an optical indicator, particularly a cross hair or an optical frame, which, projected onto the receiving element 4, identifies the area and the direction of inspection for the operator.

Furthermore, the inspection device is comprised of an evaluation unit 8 including a computer 9, where the radiation intensities measured by the detector array 6 are evaluated with respect to suspicious materials. The result of the evaluation is signaled to the operator by an indicator device 10. In its most simple form, the indicator device 10 is comprised of a light indicator having a red and a green light, for example, which light up accordingly depending on the result of the evaluation. As an alternative, the indicator device 10 can be a display unit, which shows the operator whether or not prohibited contents were detected.

To inspect the objects 3, various physical methods can be utilized. The construction of the source 5 for electromagnetic radiation and the corresponding detector array 6 respectively depends on the method used.

Preferably, the inspection is done by evaluation of diffracted X-ray radiation. It is thereby possible to either inspect the energy dispersion of polychromatic X-ray radiation with angle-sensitive detectors 6 in one or several defined angles (energy-dispersive method), or else the angle dispersion of diffracted monochromatic X-ray beams is determined (angle-dispersive method). Due to the difficulties to produce monochromatic X-ray beams of sufficient intensity, the first variation is preferred.

The X-ray radiation used for inspection is emitted by an X-ray source in a conventional manner, either as an essentially needle-shaped primary beam (pencil beam), or as X-ray beams in a fan-shaped radiation plane. In the energy-dispersive method according to the embodiment, a pencil beam is emitted and focused on the object 3 to be examined. The detector array 6 has detectors provided with collimators, which exclusively receive diffracted radiation in the defined angle. In its simplest form, there is only one defined angle. In addition, the detectors are adjustably placed in the direction of the radiation source so that the object 3 can be inspected in its entire height in the direction of the radiation source. Alternatively, several angle-defined detectors can be fixedly arranged such that any height can be inspected.

In a further embodiment, the X-ray source 5 together with the detector array 6 are adjustable and turnable relative to the receiving element 4 to allow inspection in different directions.

To determine the energy dispersion below a defined angle, detectors are deployed, which analyze the energy spectrum of incident radiation. These energy-dispersive detectors can also be beneficially arranged in an array to absorb an angle-dependent energy spectrum.

A detector array is also used in the angle-dispersive method with monochromatic X-ray radiation.

As an alternative to the evaluation of diffracted X-ray radiation, an absorption measurement, particularly with the known dual-energy method, can be taken, or else electromagnetic waves reflected by the object 3 in the micrometer area can be evaluated. In this instance, both the X-ray source 5 and the detector array 6 are designed to suit to the method. However, the evaluation of diffracted X-ray radiation is preferred because it is particularly well suited for the detection of explosives.

Figure 2:
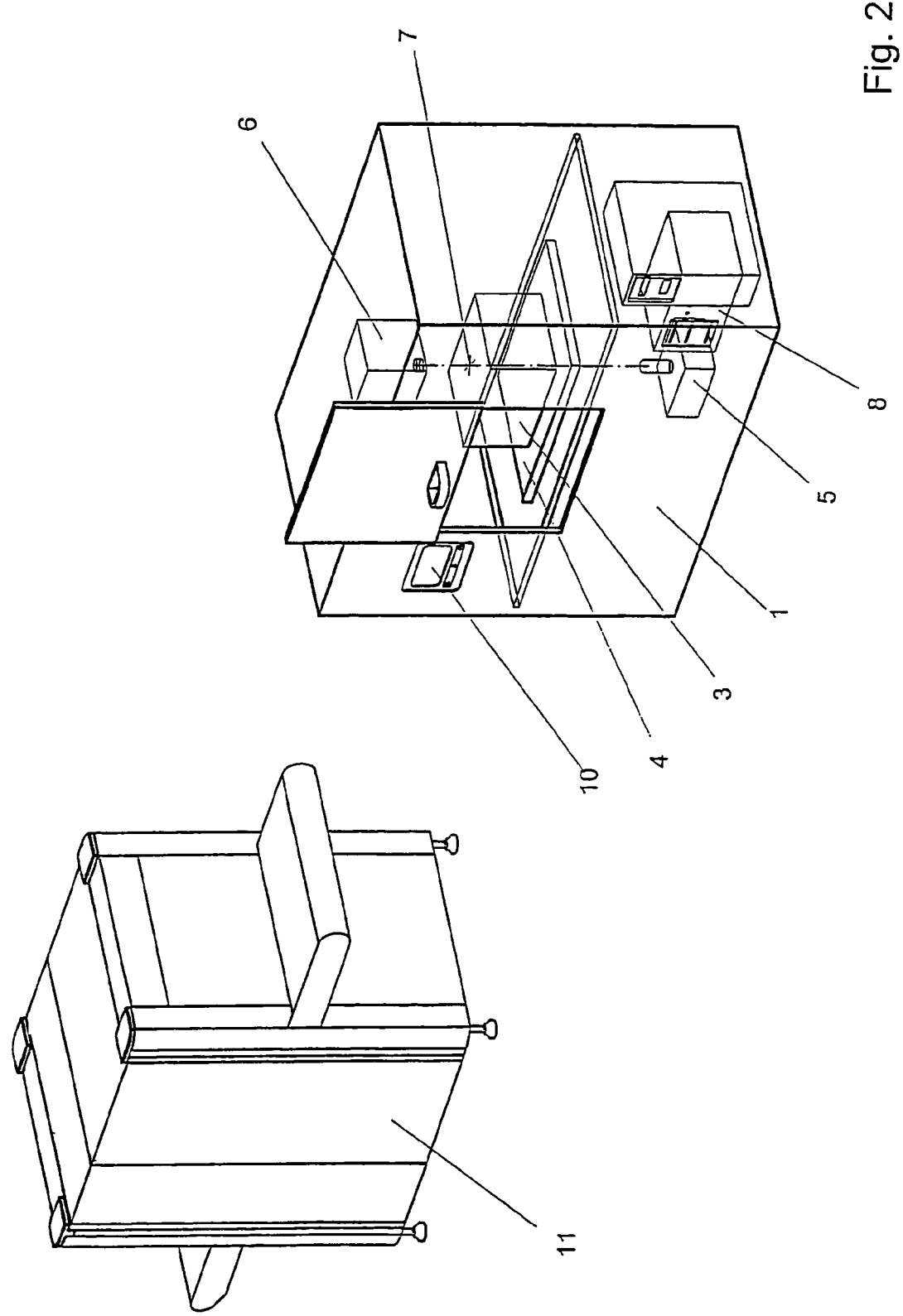
FIG. 2 illustrates an inspection device, whereby the inspection device is integrated as a second step.

As illustrated in FIG. 2, the inspection device can be combined with a conventional inspection device 11 that uses an inspection method based on the absorption of X-ray beams, to form a two-step system. However, it is also possible to utilize the inspection device as an autonomous device to inspect suspicious objects on the spot or at random. In a two-step system, the purpose of the second-step inspection device is to inspect in more detail objects 3 that were identified as not positively harmless by the inspection device 11 in the first step.

Described therebelow is an exemplary inspection process at the airport or at customs with the system in FIG. 2:

The operator inspects an object 3 (handbag, computer etc.) with the conventional X-ray device 11 of step one and discovers an unidentifiable or suspicious object. This could also be a substance in the cavity of an object of art, for example. Based on this pre-inspection, the operator is familiar with the position of the suspicious object in object 3 and thus places this object 3 onto the receiving element 4 in the inspection device such that at least one coordinate of the object is positioned within the inspection area that is optically marked by the positioning aid 7 (for example, by a frame or a cross hair). Subsequently, the housing 1 is closed, and the inspection device automatically examines the position, or a series of positions, on the basis of the still open coordinates.

The inspection device thereby records one or more sets of data, which can be illustrated as spectra, for example, and automatically evaluates them. The result of the evaluation is communicated to the operator via the indicator 10. For example, the result can be signaled via a symbolic indication (for example, red/green light for suspicious/harmless), or in written form on a screen.

Afterwards, or already during the evaluation, the operator can remove the object 3 again, or can examine an additional position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for inspecting objects for suspicious contents using electromagnetic radiation, the device comprising:
   a housing having a receiving element and a closable opening, through which the receiving element receives an object to be inspected;
   a source for electromagnetic radiation and a designated detector array, which is arranged in the housing such that an inspection area is above the receiving element;
   a positioning aid that indicates the inspection area on the receiving element to an operator; and
   an evaluation unit including a computer that analyzes the radiation, intensities measured by the detector array with respect to suspicious materials.

2. The device according to claim 1, wherein the source for electromagnetic radiation is an X-ray source.

3. The device according to claim 2, wherein for the inspection, an essentially needle-shaped primary beam or pencil beam is emitted by an X-ray source.

4. The device according to claim 2, wherein for the inspection, X-ray beams are emitted by an X-ray source in a fan-shaped radiation plane.

5. The device according to claim 2, wherein for the inspection, X-ray beams diffracted by the object are detected.

6. The device according to claim 5, wherein the energy dispersion of diffracted radiation is examined in one or more defined angles.

7. The device according to claim 5, wherein the angle dispersion of diffracted monochromatic radiation is examined.

8. The device according to claim 1, wherein the positioning aid is an optical positioning aid that forms a cross hair or an optical frame.

9. The device according to claim 1, further comprising a device for indicating the evaluation results, particularly a display unit or a light indicator.

10. The device according to claim 1, wherein the objects include luggage, baggage, or containers.

11. The device according to claim 1, wherein the positioning aid is an optical positioning aid for physically positioning the object on the receiving element.

12. The device according to claim 1, wherein the positioning aid is an optical positioning aid that is projected onto the receiving element and/or the object for physically positioning the object on the receiving element, and that identifies the inspection area and/or a direction of inspection for the operator.

13. The device according to claim 12, wherein the optical positioning aid is a cross hair or an optical frame that is projected onto the receiving element and/or the object for physically positioning the object on the receiving element, and that identifies the inspection area and/or a direction of inspection for the operator.

14. A method for inspecting objects for suspicious contents, the method comprising:
   placing, by an operator, the object into an inspection device for examination, the device including a housing having a receiving element and a closable opening, through which the receiving element receives an object to be inspected, a source for electromagnetic radiation and a designated detector array, which is arranged in the housing such that an the inspection area is above the receiving element, a positioning aid that indicates the inspection area on the receiving element to an operator, and an evaluation unit including a computer that analyzes the radiation intensities measured by the detector array with respect to suspicious materials;
   positioning the object on the receiving element such that the contents of interest is located at least partially within the inspection area; and
   inspecting the object, whereby the result of the inspection is signaled to the operator.

15. The method according to claim 14, wherein for the inspection of the suspicious contents diffracted X-ray beams are analyzed.

16. The method according to claim 14, wherein the inspection is repeatedly performed such that the object is in a different position for each inspection.

17. The method according to claim 14, further comprising:
   a) in a first step, the object is inspected using an inspection method that is based on an absorption of X-ray radiation;
   b) the position of an object that could not positively be identified as harmless is determined and indicated to a operator;
   c) the operator places the object for inspection in a second step into an inspection device and positions it on the receiving element such that the suspicious object is at least partially located within the inspection area; and
   d) the object of interest is subsequently re-inspected in the second inspection device.

18. The method according to claim 14, wherein the positioning aid is an optical positioning aid for physically positioning the object on the receiving element, and
   wherein the object is physically positioned on the receiving element such that the contents of interest are located at least partially within the inspection area indicated by the positioning aid.

19. The method according to claim 14, wherein the positioning aid is an optical positioning aid that is projected onto the receiving element and/or the object for physically positioning the object on the receiving element, and that identifies the inspection area and/or a direction of inspection for the operator, and
   wherein the object is physically positioned on the receiving element such that the contents of interest are located at least partially within the inspection area indicated by the positioning aid.

20. The method according to claim 19, wherein the optical positioning aid is a cross hair or an optical frame that is projected onto the receiving element and/or the object for physically positioning the object on the receiving element, and that identifies the inspection area and/or a direction of inspection for the operator.

21. A system for inspecting objects, particularly pieces of luggage, for suspicious contents, including a first inspection device, which evaluates non-absorbed X-ray beams from at least one X-ray source, and an adjacent second inspection device, the second inspection device comprising:
   a housing having a receiving element and a closable opening, through which the receiving element receives an object to be inspected;
   a source for electromagnetic radiation and a designated detector array, which is arranged in the housing such that an inspection area is above the receiving element;
   a positioning aid that indicates the inspection area on the receiving element to an operator for positioning the object to be inspected in the inspection area; and
   an evaluation unit including a computer that analyzes the radiation intensities measured by the detector array with respect to suspicious materials.

22. The system according to claim 21, wherein the positioning aid is an optical positioning aid for physically positioning the object on the receiving element.

23. The system according to claim 21, wherein the positioning aid is an optical positioning aid that is projected onto the receiving element and/or the object for physically positioning the object on the receiving element, and that identifies the inspection area and/or a direction of inspection for the operator.

24. The system according to claim 23, wherein the optical positioning aid is a crosshair or an optical frame that is projected onto the receiving element and/or the object for physically positioning the object on the receiving element, and that identifies the inspection area and/or a direction of inspection for the operator.

25. The system according to claim 23, wherein the source for electromagnetic radiation comprises a fixed source for electromagnetic radiation.

* * * * *